United States Patent [19]

Agrawal et al.

[11] Patent Number: 4,587,067
[45] Date of Patent: May 6, 1986

[54] METHOD OF MANUFACTURING LOW THERMAL EXPANSION MODIFIED CORDIERITE CERAMICS

[75] Inventors: Dinesh K. Agrawal; Vladimir S. Stubican, both of State College, Pa.; Yogesh Mehrotra, Trumbull, Conn.

[73] Assignee: The Perkin-Elmer Corporation, Norwalk, Conn.

[21] Appl. No.: 632,996

[22] Filed: Jul. 20, 1984

[51] Int. Cl.$^4$ .............................................. B32B 9/04
[52] U.S. Cl. ........................................ 264/63; 264/66; 264/570; 501/119
[58] Field of Search ..................... 264/66, 63, 570; 501/119

[56] References Cited

U.S. PATENT DOCUMENTS 4,296,065 10/1981 Ishii et al. ............................ 264/325
4,403,017 9/1983 Bind .................................... 501/119

OTHER PUBLICATIONS

Kobe Steel, Hot Isostatic Press, No. 428090, printed in Japan.

Primary Examiner—James Derrington
Attorney, Agent, or Firm—Thomas P. Murphy; Richard C. Wilder; Edwin T. Grimes

[57] ABSTRACT

The present invention is directed to a method of manufacturing low thermal expansion modified cordierite compositions which are especially useful in the manufacture of mirrors for high temperature applications, said method comprising the steps of: providing, on a molecular basis, a mixture of about 2 moles magnesium oxide, 2 moles aluminum oxide, and about 5 moles divided between silicon dioxide and germanium oxide; blending said materials; milling the mixture until finely divided and thoroughly mixed; forming said mixture into a desired shape; gradually heating the shape to a temperature at which reactive sintering occurs and a cordierite type structure is formed; gradually cooling the structure; and hot compacting the structure to consolidate the sintered body to very nearly 100 percent of theoretical density.

8 Claims, 2 Drawing Figures

METHOD OF MANUFACTURING LOW THERMAL EXPANSION MODIFIED CORDIERITE CERAMICS

FIELD OF INVENTION

This invention relates in general to the fabrication of bodies from low thermal expansion materials and, more particularly, to a method of manufacturing low thermal expansion modified cordierite compositions especially useful in the manufacture of small and large mirrors for high incident energy applications.

BACKGROUND OF INVENTION

Mirrors for high incident energy applications are often operated in a narrow temperature range. It is very difficult to manufacture a mirror at essentially room temperature, while designing the optical surface for applications over different intended operating temperatures higher or lower than the temperature of manufacture. In order to achieve acceptable optical characteristics over the temperature regions of application, compensation must be made in the optical design to account for the differential in the thermal expansion of the material between the temperature at which the mirror surface is shaped and the temperature at which it is to be used. This compensation is extremely difficult with materials such as pure cordierite, which has thermal expansion anisotropy, that is, which expands differently in different directions along the crystal structure.

U.S. Pat. No. 4,403,017 issued Sept. 6, 1983, discloses the development of a germanium modified cordierite family of compositions where germanium dioxide (germania) is used to partially replace silicon dioxide (silica) in the cordierite structure to yield an isotropic and very nearly or substantially zero thermal expansion family of materials.

The extremely low coefficient of thermal expansion (CTE) (approximately $10 \times 10^{-7}/°C.$ between 0° and 200° C.) of pure cordierite ($2MgO \cdot 2Al_2O_3 \cdot 5 SiO_2$) makes it an attractive material for precise optical and thermal elements. However, pure cordierite exhibits thermal expansion anisotropy. That is, its thermal expansion behavior along the crystallographic a-axis is significantly different from that along the c-axis. As a result, excessive thermal stresses are built-up within the ceramic body as it is cooled from a high sintering temperature to the room temperature. Therefore, inspite of its low CTE, pure cordierite can not be used for very high precision optical elements such as mirrors, and for support-structure elements in space related applications because the mirror figure would be severely distored as the thermal stresses relieve themselves over time during application.

As taught in the above-identified patent, thermal expansion anistropy can be overcome by partially replacing silicon dioxide (silica) in the network with oxides of elements such as manganese (Mn), magnesium (Mg), and germanium (Ge). The patent discloses a method of eliminating anisotropy by incorporating germanium dioxide ($GeO_2$) into the cordierite structure to give the chemical formula: $2MgO \cdot 2Al_2O_3 \cdot (5-x)SiO_2 \cdot xGeO_2$.

Also, according to the above-identified patent, the partial substitution of $GeO_2$ in the cordierite network provides a further advantage, i.e. that the coefficient of thermal expansion (slope of $\Delta L/L$ versus temperature graph, where L is the sample length and $\Delta L$ is the change in length over a certain temperature range, FIG. 2), can be reduced to being substantially zero in a selected temperature range by replacing part of $SiO_2$ by $GeO_2$ in the cordierite stoichiometry.

The third significant feature of the germanium cordierite family of materials is the "tailorability" of thermal expansion. That is, the temperature range for zero coefficient of thermal expansion can be varied as desired by increasing or decreasing the amount of germanium dioxide in the cordierite structure. This characteristic is henceforth in this specification referred to as "tailorability". More specifically, by varying the amount of germanium dioxide replacing the silicon dioxide in the modified cordierite, $2MgO \cdot 2Al_2O_3 \cdot (5-x)SiO_2 \cdot xGeO_2$ in the range of $0.1 \leq x \leq 4$, instantaneous CTE can be made substantially zero over selected broad temperature ranges, up to 200° C.

The present invention is directed at specifying the method of manufacturing ceramic bodies made from germanium-modified-cordierite materials.

SUMMARY OF THE INVENTION

Briefly, the present invention is directed to define a method of fabricating a germanium-cordierite ceramic body, which comprises the steps of: providing, on a molecular weight basis, a mixture of about 2 moles magnesium oxide (MgO), about 2 moles aluminum oxide ($Al_2O_3$), and about 5 moles divided between silicon dioxide ($SiO_2$) and germanium dioxide ($GeO_2$); blending said materials; milling said mixture until finely divided and thoroughly and homogeneously mixed; forming said mixture into a desired shape; gradually heating said shape to a temperature at which reactive sintering occurs among the chemical constituents and a cordierite type of crystal structure is formed; gradually cooling said body; and hot compacting the body to consolidate the sintered body to very nearly 100 percent of the theoretical density of the particular composition. In one form of the invention, a further step is incorporated which comprises stoichiometrically correcting said materials to account for the weight loss on ignition. According to another aspect of the invention, the step of hot pressing is hot isostatic pressing which is effected at a temperature of about 1100° C. and at a pressure up to about 30,000 psi (or lower).

There has thus been outlined rather broadly the more important features of the invention in order that the detailed description thereof that follows may be better understood, and in order that the present contribution to the current state of the art may be better appreciated. There are, of course, additional features of the invention which will be described more fully hereinafter. Those skilled in the art of ceramic fabrication will appreciate that the conception on which this disclosure is based may readily be utilized as the basis for the designing of other methods for carrying out the several purposes of the invention. It is important, therefore, that this disclosure be regarded as including all such equivalent methods as do not depart from the spirit and scope of the invention.

Several embodiments of the invention have been chosen for purposes of illustration and description, and are shown in the accompanying drawings, forming a part of the specification.

DETAILED DESCRIPTION OF THE PRESENTLY PREFERRED EMBODIMENTS OF THE INVENTION

The present invention is directed to the fabrication technology for manufacturing theoretically fully dense, microstructurally homogeneous and substantially zero thermal expansion ceramic bodies of germanium dioxide-modified cordierites in the $MgO$—$Al_2O_3$—$SiO_2$—$GeO_2$ quarternary system. We have now determined that the average coefficient of thermal expansion (CTE) can be made substantially zero or very nearly zero in selected temperature ranges from lower than about $-100°$ C. up to a temperature higher than about $200°$ C.

Figure 1:
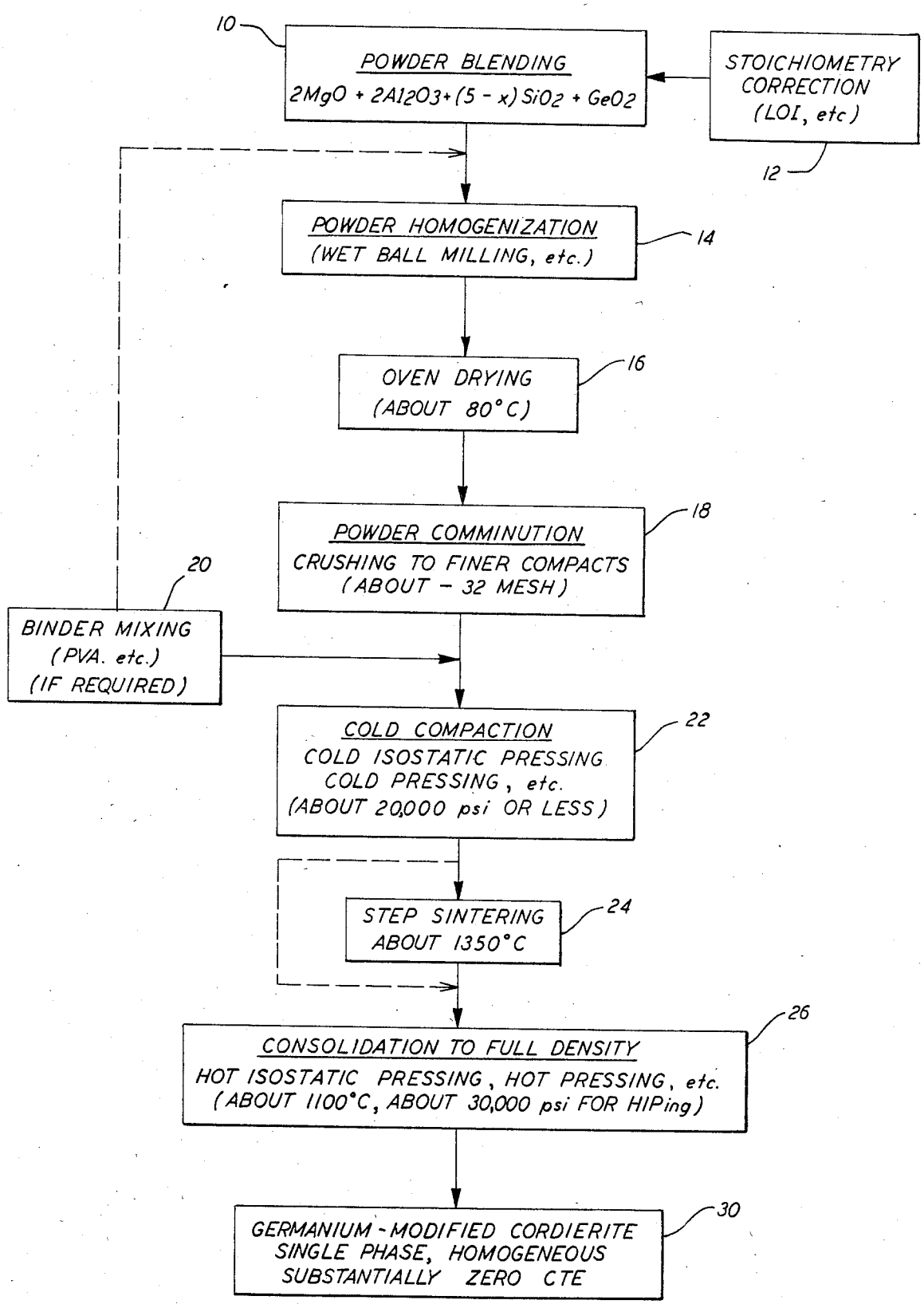
FIG. 1 is flow sheet illustrating the process for preparing dense bodies from the modified cordierite ceramics according to the invention.

As seen in the flow sheet of FIG. 1, the process of the invention comprises the step of thoroughly blending powders of magnesium oxide (MgO), aluminum oxide ($Al_2O_3$), silicon dioxide ($SiO_2$) and germanium dioxide ($GeO_2$) (Box 10).

As an example, the composition comprises $2MgO \cdot 2Al_2O_3 \cdot 4SiO_2 \cdot 1GeO_2$ where 20 mole percent of silica ($SiO_2$) is replaced by the solvent germania ($GeO_2$). For reference identification in this specification, this composition is designated as CG4.

The calculated stoichiometry is corrected by including the weight loss of the individual oxides on heating (commonly referred to as "loss on ignition" of LOI) mainly to account for the loss of adsorbed moisture. LOI is determined by heating the individual oxide powders for the suitable time at a suitable temperature above about $100°$ C. Typical parameters are about 20 hours at about $1000°$ C. for $Al_2O_3$, $SiO_2$ and MgO, and about 20 hours at about $500°$ C. for $GeO_2$. LOI is determined immediately before blending the powders together and the stoichiometry is adjusted accordingly (Box 12).

Still referring to FIG. 1, the blended powders were mixed with an adequate amount of water in a polypropylene jar to yield a good millable slurry. For example, in one case we mixed 900 ml. of water with 100 gms of blended oxide powder. It is noted that in some cases, when using fine powders, acetone is used instead of water to prevent coagulation and gelification of the powder. The slurry must be milled for several hours for homogenization of the powder (Box 14). Typically, for example, we milled the slurry using alumia balls in a weight ratio of 1:1 with the dry powder for from about 12 to about 18 hours. The resulting slurry was oven-dried in a pan at about $80°$ C. or pan-dried at about $110°$ C. (Box 16) for example about $100°$ C.

The next step in the process is powder comminution or crushing the powder to finer compacts (Box 18). For example, the cakes obtained by pan-drying (Box 16) were ground to about a $-32$ mesh ($-500$ micron) particle size. Other suitable methods of blending the mixture of oxide powders can be employed as long as it yields uniform and homogeneous fine powder.

As indicated by Box 20, small amounts of a suitable binder may or may not be mixed with the powders either before the germanium cordierite powder homogenization step (Box 14) or after the powder comminution step (Box 18). This binder, added primarily to improve the strength of the "green" (unfired) body, can easily be removed from the green body during the initial firing stages. Any suitable type of binder can be used, such as for example, an aqueous solution of polyvinyl acetate (PVA). As an example, in one case 4 ml. of 15 percent PVA solution was added to 30 gms. of the processed powder blend having the "CG4" composition. This binder was well mixed in order to coat the particles.

The next step in the process, as indicated at Box 22 in FIG. 1, is cold compaction. In this step the powder, containing the binder is cold pressed or cold isostatically pressed, or both, in gradual steps to a suitably high pressure such as, for example, about 20,000 psi (or less). At each step the pressure is held constant for a period of time sufficient to allow the system to equilibrate itself and thereby to avoid density gradients and stress cracking in the body. It will be appreciated that building up the pressure in gradual steps is essential to fabricating a ceramic body which is free from internal and external cracks that are caused by density gradients. If such cracks or delaminations are not completely eliminated at the cold pressing or cold isostatic pressing stage, they could cause complete disintegration of the fired ceramic body cold pressed (or cold isostatically pressed) samples are heat treated to about $120°$ C. for upto 2 hours to drive off the water content of PVA and then to about $400°$ C. for 4 hours to burn off the PVA completely.

After cold compaction (Box 22), the next step in the process is sintering (Box 24). According to this step the green ceramic body is sintered in a suitable furnace. Sintering may be effected at a suitable maximum temperature such as, for example about $1350°$ C. Provision must be made to provide homogeneous heat distribution in the ceramic body to enable complete chemical reaction to convert the four individual components (MgO, $Al_2O_3$, $SiO_2$ and $GeO_2$) into germanium-modified cordierite ceramics. We achieved thermal uniformity by encapsulating the body in somewhat oversized alumina-zerconia setters. We have discovered that the best results for the specific modified cordierite $2MgO \cdot 2Al_2O_3 \cdot 4SiO_2 \cdot 1GeO_2$ (CG4) are obtained by adopting the follwing sintering schedule for a specimen with the dimensions of about 2 inch in diameter and about 0.4 inch in thickness:

Room temperature to about $650°$ C.: in about 2 hours
Hold at about $650°$ C.: for about 2 hours
About $650°$ C. to about $800°$ C.: in about 10 minutes
Hold at about $800°$ C.: for about 1.50 hours
About $800°$ C. to about $900°$ C.: in about 10 minutes
Hold at about $900°$ C.: for about 16 hours
About $900°$ C. to about $1100°$ C.: in about 0.5 hours
Hold at about $1100°$ C.: for about 2 hours
About $1100°$ C. to about $1300°$ C.: in about 30 minutes
Hold at about $1300°$ C.: for about 2 hours
About $1300°$ C. to about $1360°$ C.: in about 30 minutes
Hold at about $1360°$ C.: for about 2 hours.

It will be appreciated that the particular heating schedule and the maximum temperature of sintering are dependent on the specific composition of the ceramic germanium cordierite body. That is, sintering kinetics vary depending on the fraction of germania ($GeO_2$) substituted for silica ($SiO_2$) in the cordierite. In addition, the schedule of sample heating is also dependent on the sample size; therefore, provision must be made to allow for thermal equilibrium to be achieved at each step. The maximum temperature of sintering must be chosen so as to avoid formation of an undesirable second phase, whether crystalline or glassy.

It is important that the cooling schedule for the ceramic bodies from the sintering temperature to the room temperature be carefully selected. The body must be cooled slowly to avoid thermal shocks due to stress buildup. At the same time, cooling especially near the sintering temperature, must be rapid enough to prevent excessive grain growth because, for optical applications, the finer the grain size, the better the polish that the ceramic body can be given. This is an important feature for optical grade ceramic material. As a result, the entire sintering schedule, including heating and cooling, was carefully determined in order to avoid cracking, warping, and pore entrapment, and to achieve a dense, microstructurally homogeneous, single phase material with fine-grained morphology.

Subsequent to sintering, the dense ceramic body is further consolidated to obtain 100 percent or very nearly 100 percent of the theoretical density of the material (Box 26). Hot pressing or hot isostatic pressing (HIP) may be employed. In some cases, hot isostatic pressing at a temperature of about 1100° C. at about 30,000 psi may be suitable. This hot isostatic pressing can be effected in two alternative ways. In one case, depending on the extent of open porosity in the ceramic body, the hot isostatic pressing can be conducted by encasing the body in a can of a suitable material using the well known canning process. In the other cases, especially if the body has very little open porosity, containerless hot isostatic pressing is possible. The present invention includes either one of the two forms in achieving its ultimate goal of substantially full theoretical density on the surface to be polished, depending on the extent of volume density achieved in the green or unsintered ceramic body. In one form a high hot isostatic pressing pressure is employed with a corresponding lower temperature, and in the other form a high hot isostatic pressing temperature is employed with a corresponding lower pressure.

We have also discovered that the step of hot isostatic pressing can be performed directly after cold pressing or cold isostatic pressing as indicated by the broken arrow 28 in FIG. 1. That is, by combining the sintering and hot isostatic pressing steps, the processed powder can be consolidated into a fully dense single phase and microstructurally homogeneous germanium cordierite ceramic body. Such a combination of the processing steps may require a somewhat higher temperature and/or time. It should be noted that if the starting powders are very fine, the percentage volume reduction to achieve full density is very large. Thus, we have discovered and established that fully dense, single phase germanium cordierite ceramic bodies can be fabricated by either employing a separate intermediate sintering step or by combining this step with the hot isostatic pressing step. The final germanium-modified cordierite is obtained as indicated by Box 30 in FIG. 1.

The modified germanium cordierite compositions embodied in this invention were analyzed at each processing step. X-ray powder diffraction analysis showed the formation of a single phase cordierite solid solution for compositions about in the range from $0.1 \leq x \leq 3.0$ in the molecular formula, $2MgO \cdot 2Al_2O_3 \cdot (5-x)SiO_2 \cdot xGeO_2$. Examination under a scanning electron microscope at both low and very high magnifications established complete microstructural homogeneity.

Material volume density was determined using mercury porosimetry and water immersion techniques. Theoretical density was calculated from the cell dimensions determined by X-ray diffraction techniques. As an example, theoretical material density of modified cordierite $2MgO \cdot 2Al_2O_3 \cdot 4SiO_2 \cdot 1GeO_2$ (CG4) was determined to be 2.695 grams per cubic centimeter. Presintering (green) density for CG4 was 1.35 grams per cubic centimeter; full density was achieved upon sintering and hot isostatic pressing of the ceramic body at a temperature of up to about 1360° C. and pressure up to about 30,000 psi.

Figure 2:
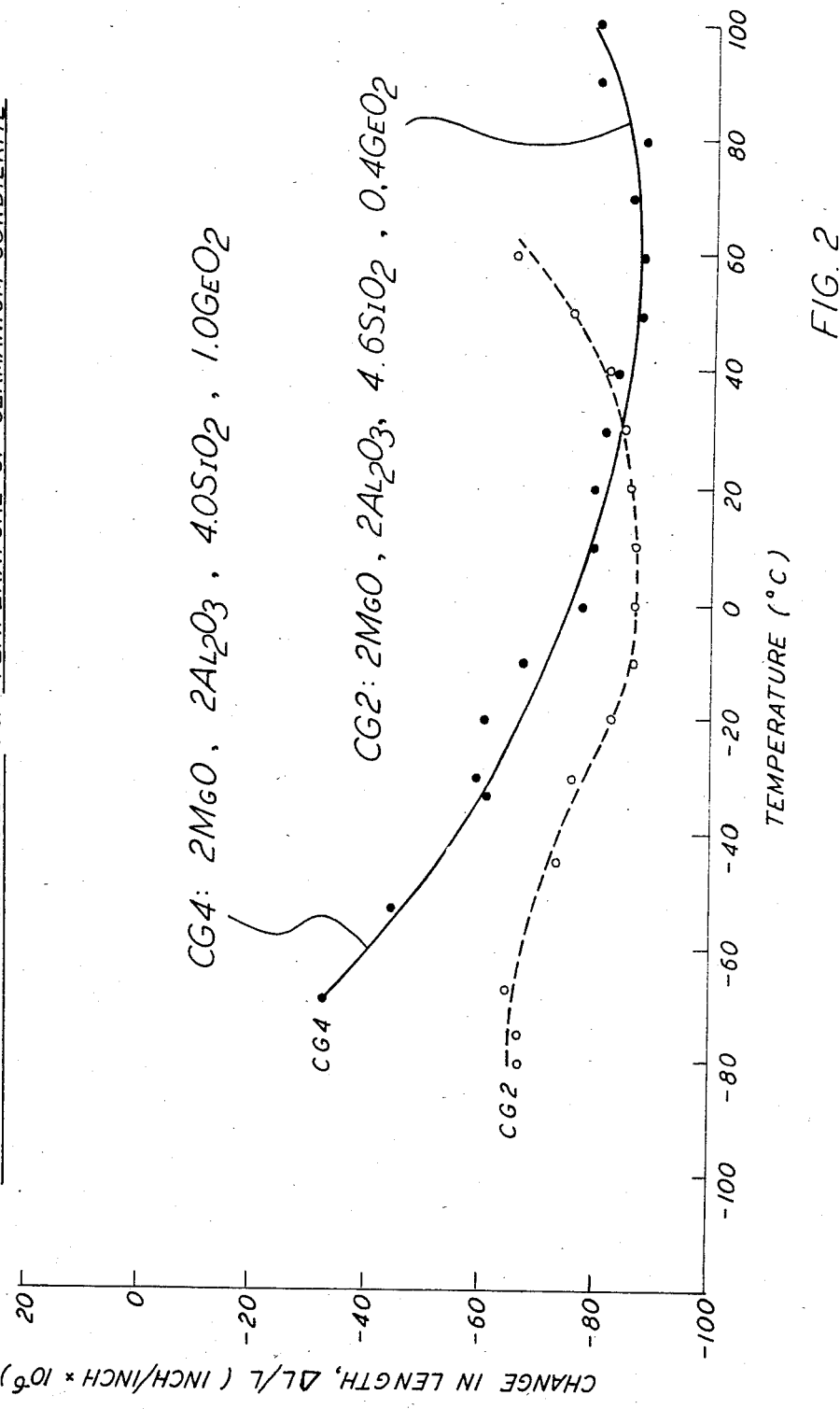
FIG. 2 is a plot of the linear thermal expansion against temperature for two germanium cordierite compositions, the slope of each curve being the coefficient of thermal expansion for that particular composition.

The coefficient of thermal expansion was determined using the extremely precise technique of Michelson interferometry. FIG. 2 is a representative plot showing the variation of the linear dimension with temperature over temperature regions of interest for two germanium cordierite compositions, namely, $2MgO \cdot 2Al_2O_3 \cdot 4.6SiO_2 \cdot 0.4GeO_2$ (CG2) and $2MgO \cdot 2Al_2O_3 \cdot 4SiO_2 \cdot 1GeO_2$ (CG4). As shown, the instantaneous coefficient of thermal expansion (slope of $\Delta L/L$ versus T plot) is zero for CG2 in the temperature range $-10°$ C. to $+30°$ C., and for CG4 in the range of $40°$ C. to $+80°$ C. The average coefficient of thermal expansion for each composition is zero over a much wider temperature range due to a minimum in its thermal expansion curve. From these curves it will be appreciated that the tailorability of compositions in the germanium cordierite family allows achievement of substantially zero thermal expansion in the temperature region of interest. Furthermore, isotropy of the coefficient of thermal expansion was demonstrated by measuring thermal expansion of samples taken from different parts of the ceramic body and by measuring thermal expansion along the three orthogonal axes.

A very high quality surface was obtained by polishing samples of the CG4 composition using alumina slurries. This polishability is achieved due to the fact that we have fabricated ceramic bodies that are according to the invention fine grained, fully dense and microstructurally homogeneous materials.

It will thus be seen that the present invention does indeed define a method of fabricating a germanium-cordierite ceramic body, which effectively meets the objects specified hereinbefore.

Although certain particular embodiments of the invention are herein disclosed for purposes of explanation and illustration, various modifications thereof, after study of this specification, will be apparent to those skilled in the art to which the invention pertains. As such, these modifications and variations are all considered part of this invention. Reference should accordingly be made to the appended claims in determining the scope of the invention.

What is claimed is:

1. A method of fabricating germanium-cordierite ceramic body comprising the sequential steps of:
    providing on a molecular basis, a powdered mixture of about 2 moles magnesium oxide, about 2 moles aluminum oxide, and about 5 moles divided between silicon dioxide and germanium oxide;
    blending said powders;
    homogenizing said powders until finely divided and thoroughly mixed;
    oven drying said powders at a temperature of about 100° C.;

densifying said powders by grinding to about a −32 mesh;

cold compacting said powders into a desired shape by cold pressing said powders by building up the pressure in a series of gradual steps while holding the pressure constant at each step for a period of time sufficient to allow the system to reach equilibrium;

gradually heating said compact to a temperature at which reactive sintering occurs and a cordierite type structure is formed;

gradually cooling said structure; and hot isotatic pressing said structure at a temperature of about 1100° C. and a pressure of about 30,000 psi to consolidate the sintered body to very nearly 100 percent of the theoretical density.

2. A method according to claim 1 further comprising the step of stoichiometrically correcting said materials to correct for the weight loss on ignition.

3. A method according to claim 1 wherein said mixture is milled and homogenized for from about 12 hours to about 18 hours and an anti-coagulation dispersion agent is added to the mixture prior to milling.

4. A method according to claim 1 further comprising the step of adding binder materials to said powders before said step of homogenizing said powders.

5. A method according to claim 1 further comprising the step of adding binder to said powders subsequent to the step of densifying said powders.

6. A method according claim 1 wherein said cold pressing in effected up to a maximum pressure of about 20,000 psi.

7. A method according to claim 1 wherein said sintering temperature is about 1350° C.

8. A method according to claim 1 wherein the temperature schedule in said sintering step consists of gradually heating said compact to a temperature at which sintering occurs as follows:

Room temperature to about 650° C.: in about 2 hours
Hold at about 650° C.: for about 2 hours
About 650° C. to about 800° C.: in about 10 minutes
Hold at about 800° C.: for about 1.50 hours
About 800° C. to about 900° C.: in about 10 minutes
Hold at about 900° C.: for about 16 hours
About 900° C. to about 1100° C.: in about 0.5 hours
Hold at about 1100° C.: for about 2 hours
About 1100° C. to about 1300° C.: in about 30 minutes
Hold at about 1300° C.: for about 2 hours
About 1300° C. to about 1360° C.: for about 30 minutes
Hold at about 1360° C.: for about 2 hours.

* * * * *